United States Patent
McNeil (10) Patent No.: US 6,269,657 B1
(45) Date of Patent: Aug. 7, 2001

(54) PROCESS AND APPARATUS FOR SEPARATING MIXTURES OF HYDROGEN AND CARBON MONOXIDE

(75) Inventor: Brian Alfred McNeil, Chessington (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/586,338

(22) Filed: Jun. 2, 2000

(30) Foreign Application Priority Data

Apr. 8, 1999 (GB) .................................... 9918420

(51) Int. Cl.[7] ....................................... F25J 1/00
(52) U.S. Cl. ..................... 62/631; 62/920; 62/931
(58) Field of Search .................. 62/630, 631, 920, 62/931

(56) References Cited

U.S. PATENT DOCUMENTS

| | | | | |
|---|---|---|---|---|
| 4,478,621 | * | 10/1984 | Fabian | 62/920 |
| 4,888,035 | * | 12/1989 | Bauer | 62/920 |
| 5,133,793 | | 7/1992 | Billy | 62/23 |
| 5,295,356 | * | 3/1994 | Billy | 62/920 |

FOREIGN PATENT DOCUMENTS 0895961   2/1999   (EP) ................................ C01B/3/50

* cited by examiner

*Primary Examiner*—Ronald Capossela
(74) *Attorney, Agent, or Firm*—Geoffrey L. Chase (57) ABSTRACT

Hydrogen and carbon monoxide are separated from a condensate-containing gaseous mixture thereof by using (a) a "first" stripping column (8) to remove the hydrogen content of the CO-loaded methane stream (6) obtained by washing CO from the gaseous mixture, or the vapor portion from a phase separation thereof, ascending a methane wash column (2) and (b) a "second" stripping column or a flash separator (30) to remove the hydrogen content of the feed gas condensate (9) obtained from the methane wash column (2), or the phase separation. The vapor stream (32) from the second stripping column or flash separator (30) is fed to the first stripping column (8). The liquid stream from the first stripping column and the liquid stream (33) from the second stripping column or flash separator (30) are fed (16, 17, 19 & 20; 34 to 39) to different locations of a separation column (18) providing a gaseous carbon monoxide product stream (21) and a liquid methane wash recycle stream (3). The process improves the efficiency of the separation by avoiding dilution of the CO concentration of the feed gas condensate (9) with the CO-loaded methane stream (6) which occurs in prior art CO/hydrogen separations using a methane wash.

21 Claims, 3 Drawing Sheets

PROCESS AND APPARATUS FOR SEPARATING MIXTURES OF HYDROGEN AND CARBON MONOXIDE

TECHNICAL FIELD OF THE INVENTION

This invention relates to a process and apparatus for separation of hydrogen and carbon monoxide from gaseous mixtures thereof. It has particular, but not exclusive, application to the recovery of hydrogen and carbon monoxide from synthesis gas.

BACKGROUND OF THE INVENTION

Carbon monoxide is usually obtained by separation from synthesis gas produced by catalytic conversion or partial oxidation of natural gas, oils or other hydrocarbon feedstock. Synthesis gas consists primarily of hydrogen and carbon monoxide and, depending on the level of purity, typically also contains small amounts of inter alia methane and nitrogen. It is well known to separate carbon monoxide from synthesis gas by a cryogenic separation process in which carbon monoxide is removed by a low temperature scrubbing step using liquid methane in a wash column to provide a CO-loaded methane liquid containing some, typically 2 to 4%, hydrogen. Residual hydrogen is removed from the CO-loaded methane liquid in, for example, a stripping column or flash separator to meet the required carbon monoxide product specification and the resultant hydrogen-stripped CO-loaded methane liquid is separated into a gaseous carbon monoxide product and liquid methane in a separation column. The bulk of the liquid methane is recycled to provide the methane wash liquid and a portion of the carbon monoxide product can be recycled to provide a heat pump stream.

The CO-loaded methane liquid can be withdrawn entirely from the sump of the methane wash column, in which case it is admixed with condensate from the feed gas.

However, the condensate usually has a much higher CO concentration (typically 60 to 70% CO) than the CO-loaded methane (typically 20 to 30% CO), which higher concentration is diluted by admixture with the CO-loaded methane thereby decreasing the efficiency of the subsequent separation of CO from methane. In order to mitigate this reduction in potential efficiency, the CO-loaded methane can be separately withdrawn from a location above the synthesis gas feed and fed to a stripping column at a higher location than the feed gas condensate.

European Patent Publication No. 0895961A discloses the separation of synthesis gas, or other gaseous mixtures of hydrogen and carbon monoxide, by a process in which the CO-loaded methane and feed gas condensate are separately fed from the methane wash column to vertically spaced locations of a stripping column. The stripping column is refluxed with a methane-rich scrubbing liquid withdrawn from an intermediate location of the methane wash column. Preferably, the hydrogen-stripped CO-loaded methane liquid is split into two substreams. One substream is subcooled and the subcooled liquid introduced into the separation column. The other substream is at least partially vaporized and introduced into the separation column at a location below that of the subcooled substream.

U.S. Pat. No. 5133793 discloses the separation of synthesis gas, or other gaseous mixtures of hydrogen and carbon monoxide, by a process in which feed gas condensate is separated from the feed prior to the methane wash column. Only the vapor portion from that separation is fed to the wash column. The condensate is vaporized and fed to the stripping column at a location below that of the sump liquid from the wash column. The hydrogen-stripped CO-loaded methane liquid is subcooled and split into three substreams. One substream is introduced, at about its bulb temperature, at upper location of the separation column. Another substream is vaporized and introduced, at about its dew point, at a lower location of the separation column. The third substream is vaporized and introduced, at a temperature intermediate that of the other two substreams, at an intermediate location of the separation column.

Although the feeding of feed gas condensate to a stripping column separately from the CO-loaded methane does increase the efficiency with which hydrogen is removed in that column, it does not obviate the loss in potential efficiency in reduction of the CO concentration of the condensate on admixture with the CO-loaded methane. However, the necessity of this loss has been accepted in the art.

It is an object of the present invention to improve the efficiency of separation of carbon monoxide from a mixture with hydrogen. This is achieved by reducing the extent to which the CO concentration in the feed gas condensate is diluted prior to the separation of CO and methane.

SUMMARY OF THE INVENTION

The present invention provides an improvement in a process for separating hydrogen and carbon monoxide from a condensate-containing gaseous mixture thereof in which the gaseous mixture, or a vapor portion from phase separation thereof, is scrubbed with a liquid methane wash stream in a methane wash column to provide a gaseous hydrogen product stream and a liquid CO-loaded methane stream. This CO-loaded methane stream is separated into a gaseous hydrogen-rich stream and a liquid CO/methane stream in a first stripping column and the resulting CO/methane stream is separated into a gaseous carbon monoxide stream and a liquid methane stream in a separation column. The improvement consists in that feed gas condensate from the methane wash column, or from the phase separation, is separated into a second gaseous hydrogen-enriched stream and another ("second") liquid CO/methane stream in a second stripping column or a flash separator; the second gaseous hydrogen-enriched stream is fed to the first stripping column; and the second liquid CO/methane stream is fed to the separation column.

The invention also provides an improved apparatus for separating hydrogen and carbon monoxide from a condensate-containing gaseous mixture. The apparatus comprises a methane wash column; means for feeding the gaseous mixture to the methane wash column and optionally including phase separation means for removing a feed gas condensate from the gaseous mixture; a first stripping column; a carbon monoxide/methane separation column; means for feeding CO-loaded methane from the methane wash column to the stripping column; means for feeding liquid CO/methane from the stripping column to the separation column; and means for recycling liquid methane from the separation column to the methane wash column. The improvement consists in that the apparatus further comprises second stripping column or a flash separator; means for feeding feed gas condensate from the methane wash column, or from the phase separation means, to the second stripping column or flash separator;

means for feeding a second gaseous hydrogen-enriched stream from the second stripping column or flash separator to the first stripping column; and means for feeding a second liquid CO/methane stream from the second stripping column or flash separator to the separation column.

BRIEF DESCRIPTION OF THE DRAWINGS

The same reference numerals are used to identify the same or equivalent items in all three drawings.

DETAILED DESCRIPTION OF THE INVENTION

Accordingly, in a first aspect of the invention, there is provided a process for separating hydrogen and carbon monoxide from a condensate-containing gaseous mixture thereof, said process comprising:

(a) scrubbing the gaseous mixture, or a vapor portion from phase separation thereof, with a liquid methane wash stream in a methane wash column to provide a gaseous hydrogen product stream and a "first" liquid CO-loaded methane stream;

(b) separating said CO-loaded methane stream into a gaseous hydrogen-rich stream and a liquid CO/methane stream in a "first" stripping column; and (c) separating said first liquid CO/methane stream into a gaseous carbon monoxide stream and a liquid methane stream in a separation column, wherein feed gas condensate from the methane wash column, or from the phase separation, is separated into a "second" gaseous hydrogen-enriched stream and a "second" liquid CO/methane stream in a "second" stripping column or a flash separator; the second gaseous hydrogen-enriched stream is fed to the first stripping column; and the second liquid CO/methane stream is fed to the separation column.

In a second aspect of the invention there is provided an apparatus for separating hydrogen and carbon monoxide from a condensate-containing gaseous mixture thereof by a process of the first aspect, said apparatus comprising:

(a) a methane wash column;

(b) means for feeding the gaseous mixture to the methane wash column and optionally including phase separation means for removing a feed gas condensate from the gaseous mixture;

(c) a "first" stripping column;

(d) a carbon monoxide/methane separation column;

(e) means for feeding CO-loaded methane from the methane wash column to the first stripping column;

(f) means for feeding liquid CO/methane from the first stripping column to the separation column; and (g) means for recycling liquid methane from the separation column to the methane wash column, wherein the apparatus further comprises a "second" stripping column or a flash separator;

means for feeding feed gas condensate from the methane wash column, or from the phase separation means, to the second stripping column or flash separator;

means for feeding a "second" gaseous hydrogen-enriched stream from the second stripping column or flash separator to the first stripping column; and means for feeding a "second" liquid CO/methane stream from the second stripping column or flash separator to the separation column.

The invention has particular application to the separation of carbon monoxide from synthesis gas produced by catalytic conversion or partial oxidation of natural gas, oils or other hydrocarbon feedstock. However, it is of general application to the cryogenic separation of other gaseous mixtures containing hydrogen and carbon monoxide, especially those consisting primarily of hydrogen and carbon monoxide.

In a presently preferred embodiment, the condensate-containing gaseous mixture is fed to the methane wash column and the CO-loaded methane and feed gas condensate are separately removed from vertically spaced locations of said column. According to the alternative embodiment, the condensate-containing gaseous mixture is phase separated to provide the feed gas condensate; the uncondensed (vapor) portion is fed to the methane wash column; and the condensate is fed to the second stripping column or flash separator.

It is preferred that the feed gas condensate is partially vaporized before being fed to the second stripping column or flash separator.

The second liquid CO/methane stream can be split into at least two substreams; one substream being subcooled and the subcooled liquid introduced into the separation column and another substream being at least partially vaporized and introduced into the separation column at a location below that of the subcooled substream.

The first liquid CO/methane stream also can be split into at least two substreams; one substream being subcooled and the subcooled liquid introduced into the separation column and another substream being at least partially vaporized and introduced into the separation column at a location below that of said subcooled substream.

The first stripping column can be refluxed with a methane-rich liquid stream withdrawn from an intermediate location of the methane wash column above the level of removal of the CO-loaded methane therefrom as taught in European Patent Publication No. 0895961 A, the entirety of the disclosure of which is incorporated by this reference.

Figure 1:
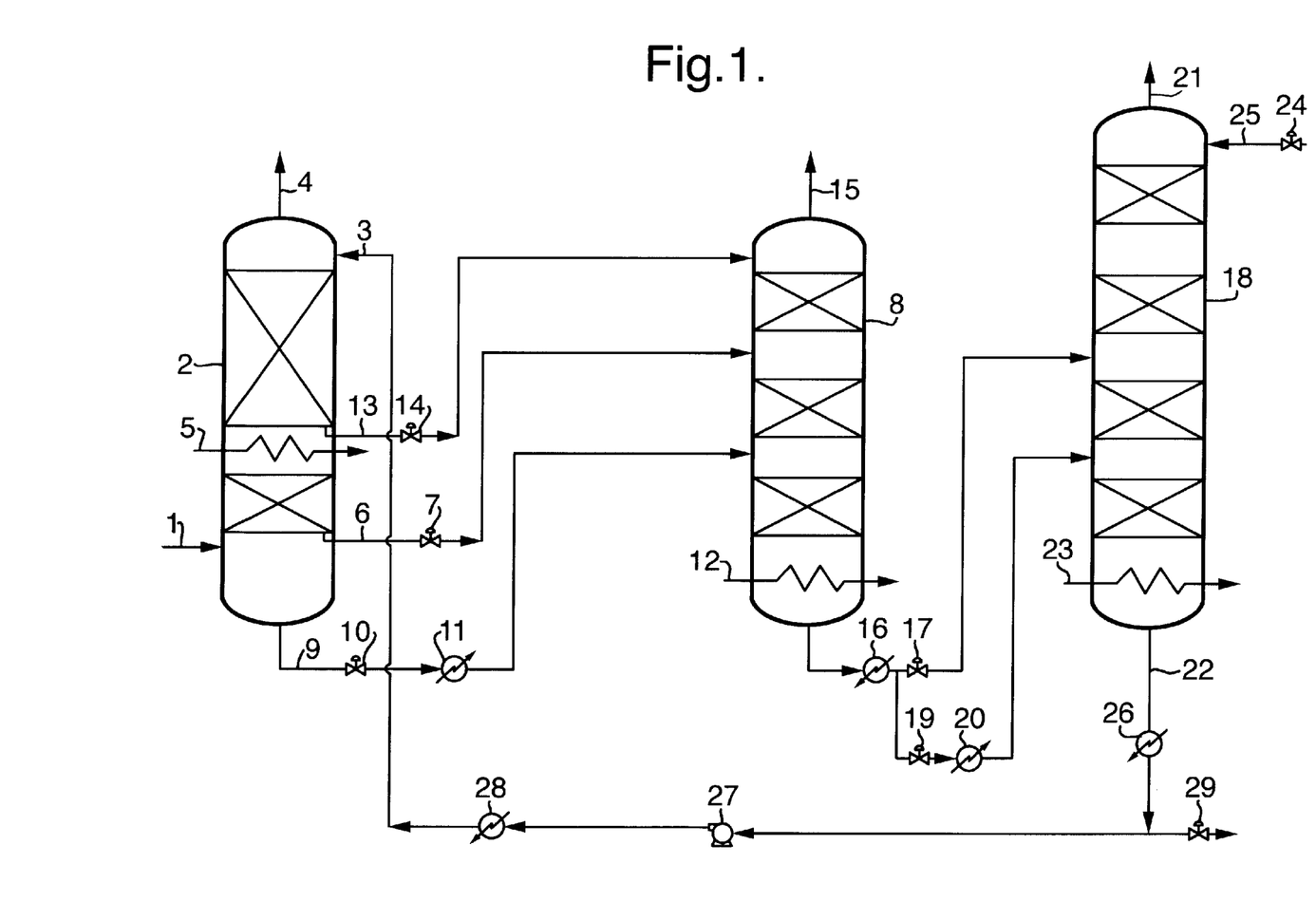
FIG. 1 is a schematic representation of a process and apparatus in accordance with the teaching of European Patent Publication No. 0895961A.

Referring first to FIG. 1, partially condensed crude synthesis gas is fed via conduit 1 to the bottom of methane wash column 2. The vapor rising up through the wash column trays or packing is scrubbed with liquid methane introduced at the top of the column via conduit 3. This dissolves carbon monoxide into the liquid methane and produces an overhead hydrogen product in conduit 4. The heat of solution of carbon monoxide in the wash methane is typically removed by indirect heat exchange with at least part of a liquid carbon monoxide heat pump stream in heat exchanger(s) 5. This can typically be accomplished by at least one contactor heat exchanger as described in U.S. Pat. No. 3,813,889 and is shown only schematically here. The number of contactor heat exchangers, their position and configuration within the methane wash column stages, is such as to most economically provide near isothermal operation of the column.

The CO-loaded methane from the bottom stage of the methane wash column, (which typically contains 2% to 4% H$_2$), is removed via conduit 6, reduced in pressure by control valve 7, and introduced into stripping column 8, containing trays or packing, where hydrogen is stripped from the liquid in order to achieve the required carbon monoxide product purity specification. Condensate in the crude synthesis gas feed is removed from the sump of the methane wash column via conduit 9, reduced in pressure by control valve 10, and partly vaporized in heat exchanger 11, preferably by indirect heat exchange with at least part of the crude synthesis gas upstream of conduit 1. Alternatively other heat exchange means could be provided. The partly vaporized liquid is then fed to stripping column 8 several stages below the introduction of the liquid in conduit 6 to provide part of the stripping vapor for hydrogen removal from the latter stream. A reboiler 12 in the bottom of the stripping column 8 provides stripping vapor for the liquid in both feed streams. The liquid introduced via conduit 6 also serves to scrub some of the carbon monoxide from the vapor passing through the hydrogen stripping column. A methane rich scrubbing liquid is withdrawn from an appropriate stage of the methane wash column via conduit 13, reduced in pressure by control valve 14, and used to provide wash liquid to the top of the stripping column 8 to further reduce carbon monoxide losses in the reject hydrogen stream from conduit 15.

Liquid from the bottom of the stripping column 8 is subcooled in heat exchanger 16 and then divided into two substreams. The first substream is reduced in pressure by control valve 17, and introduced to carbon monoxide/methane separation column 18. The second substream is reduced in pressure by control valve 19, partially vaporized in heat exchanger 20, and introduced to separation column 18 several stages below the subcooled liquid from control valve 17. The two feeds are separated in separation column 18 into carbon monoxide and methane streams in conduits 21 and 22 respectively. The column 18 is reboiled by reboiler 23, and reflux is provided by direct introduction of liquid carbon monoxide via control valve 24 and conduit 25. Heat transfer in heat exchangers 16 and 20 is accomplished by indirect heat exchange with other process streams and is not detailed here. Purified methane liquid in conduit 22 is subcooled in subcooler 26 by indirect heat exchange with other process streams, not detailed here, and then divided. The major part of stream 22 is pumped by pump 27 to methane wash column pressure, further subcooled in heat exchanger 28, and introduced to the top of the methane wash column 2 via conduit 3. The minor portion of stream 22 is removed from the distillation system via control valve 29.

Table 1 summarizes a mass balance for a typical application of the process of FIG. 1.

TABLE 1

| | | Stream | | | | | | | | | |
|---|---|---|---|---|---|---|---|---|---|---|---|
| | | 1 | 3 | 4 | 6 | 9 | 13 | 15 | 21 | 22 | 25 |
| Pressure | bar (a) | 21.7 | 22.6 | 21.4 | 21.6 | 21.6 | 21.5 | 5.5 | 2.8 | 3.0 | 2.8 |
| Temperature | deg C. | −180 | −181 | −181 | −173 | −180 | −178 | −166 | −182 | −146 | −182 |
| Flowrate | kgm/h | 100.0 | 39.0 | 69.4 | 49.0 | 17.5 | 3.0 | 2.8 | 31.7 | 42.9 | 7.9 |
| Hydrogen | mol % | 70.3 | | 98.7 | 2.2 | 3.6 | 1.8 | 62.5 | | | 0 |
| Nitrogen | mol % | 1.4 | | 0.2 | 1.4 | 3.1 | 2.2 | 4.2 | 5.0 | | 5.0 |
| Carbon monoxide | mol % | 23.2 | | | 23.0 | 66.8 | 7.1 | 21.4 | 95.0 | | 95.0 |
| Methane | mol % | 5.0 | 100 | 1.1 | 73.3 | 26.4 | 89.0 | 11.9 | | 100.0 | 0 |
| Vapor fraction | | 0.8232 | 0 | 1 | 0 | 0 | 0 | 1 | 1 | 0 | 0.0462 |

Figure 2:
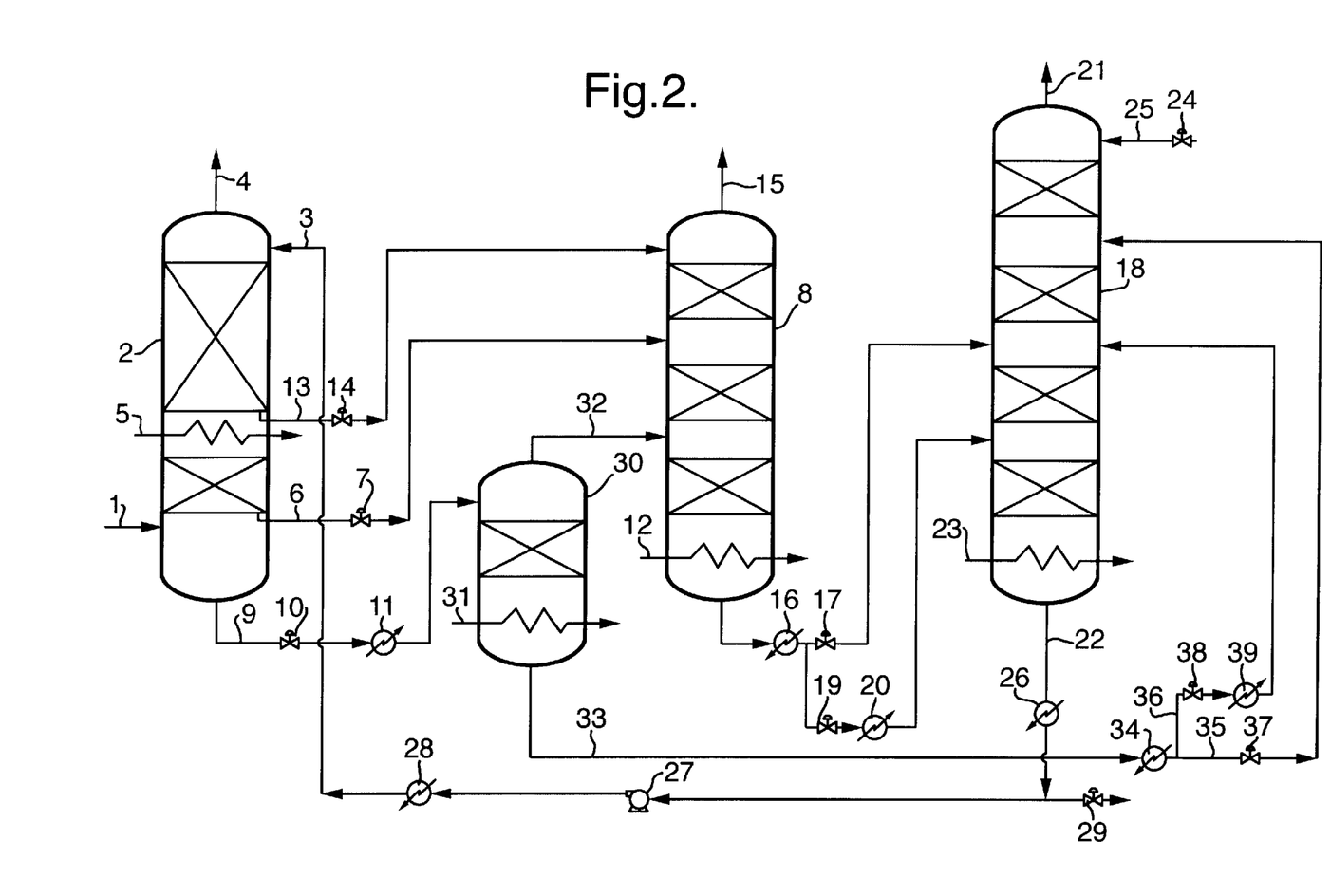
FIG. 2 is a schematic representation of a preferred embodiment of the process and apparatus of the present invention.

Referring now to FIG. 2, the illustrated preferred embodiment of the invention differs from the process and apparatus of FIG. 1 in that the partially vaporized condensate from heat exchanger 11 is fed to the top of second stripping column 30. This column 30 contains trays or packing and reboiler 31 in the bottom of the column provides stripping vapor to strip hydrogen from the liquid in order to achieve the required CO product purity specification. Vapor from second stripping column 30 is fed via conduit 32 to stripping column 8 several stages below the introduction of the CO-loaded methane from conduit 6 to provide part of the stripping vapor for hydrogen removal from the CO-loaded methane.

Liquid in conduit 33 from the bottom of the second stripping column 30 is subcooled in heat exchanger 34 and divided into two substreams 35 and 36. Substream 35 is reduced in pressure by control valve 37 and introduced to column 18 several stages above the subcooled liquid from control valve 17. Substream 36 is reduced in pressure by control valve 38, partially vaporized in heat exchanger 39, and introduced to column 18 at about the same location as the subcooled liquid from control valve 17. The four feeds are separated in column 18 into the purified CO and methane streams in conduits 21 and 22 respectively. Heat transfer in heat exchangers 34 and 39 is accomplished by indirect heat exchange with other process streams and is not detailed here.

Table 2 summarizes a mass balance for a typical application of the process of FIG. 2.

TABLE 2

| | | Stream | | | | | | | | | | |
|---|---|---|---|---|---|---|---|---|---|---|---|---|
| | | 1 | 3 | 4 | 6 | 9 | 32 | 13 | 15 | 21 | 22 | 25 |
| Pressure | bar (a) | 21.7 | 22.6 | 21.4 | 21.6 | 21.6 | 5.6 | 21.5 | 5.5 | 2.8 | 3.0 | 2.8 |
| Temperature | deg C. | −180 | −181 | −181 | −173 | −180 | −168 | −178 | −167 | −182 | −146 | −182 |
| Flowrate | kgm/h | 100.0 | 39.1 | 69.4 | 48.2 | 17.5 | 7.4 | 3.9 | 2.8 | 30.3 | 43.0 | 6.5 |
| Hydrogen | mol % | 70.3 | | 98.7 | 2.2 | 3.6 | 8.6 | 1.8 | 62.4 | | | |
| Nitrogen | mol % | 1.4 | | 0.1 | 1.4 | 3.1 | 4.6 | 2.1 | 4.7 | 5.0 | | 5.0 |
| Carbon monoxide | mol % | 23.2 | | | 23.3 | 66.8 | 80.8 | 7.2 | 21.3 | 95.0 | | 95.0 |
| Methane | mol % | 5.0 | 100.0 | 1.1 | 73.0 | 26.4 | 6.0 | 88.9 | 11.5 | | 100.0 | |
| Vapor fraction | | 0.8232 | 0 | 1 | 0 | 0 | 1 | 0 | 1 | 1 | 0 | 0.0462 |

Figure 3:
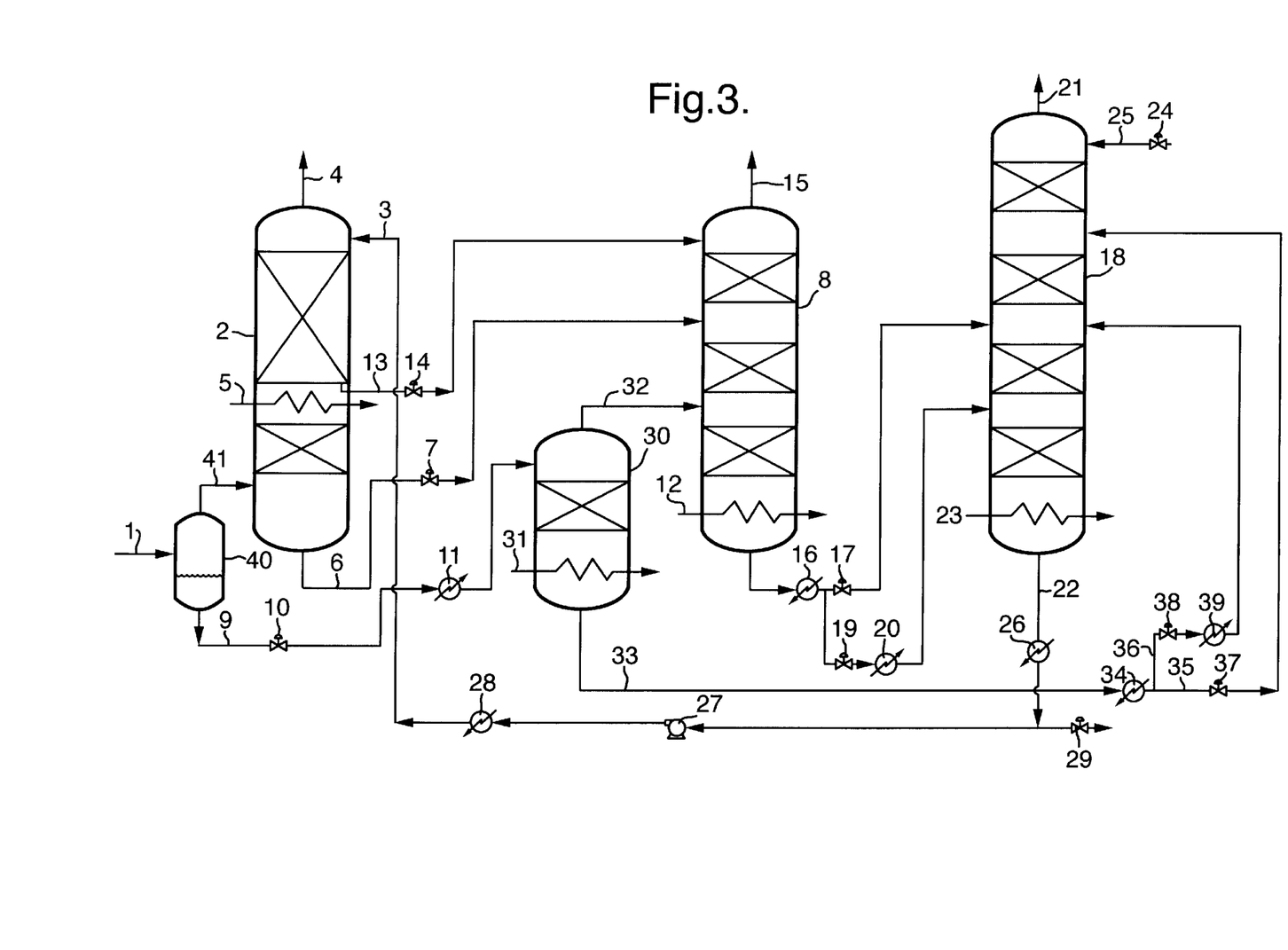
FIG. 3 is a schematic representation of another embodiment of the process and apparatus of the invention.

Referring now to FIG. 3, another embodiment of the present invention differs from that of FIG. 2 in that condensate is separated from the feed 1 by a phase separator 40 and only the vapor portion fed to the wash column 2 via conduit 41. The CO-loaded methane and any condensate from the vapor portion feed is withdrawn from the sump of the column 2 and fed, via conduit 6 and control valve 7, to stripping column 8. The condensate separated in phase separator 40 is fed, via conduit 9, control valve 10 and heat exchanger 11, to the second stripping column 30.

Table 3 summarizes a mass balance for a typical application of the process of FIG. 3.

It will be appreciated from the preceding description of the present invention that it differs from the prior art by utilizing a second stripper column or a flash separator to reject hydrogen, thus keeping the CO-richer condensed feed liquid separate from the CO-leaner methane wash column liquid. The invention therefore benefits by reducing the energy required for CO/methane separation. Consequently the recycle heat pump flowrate that is required for the regeneration column separation is reduced, resulting in a compressor power reduction of about 3% to 5%.

TABLE 3

| | | Stream | | | | | | | | | | |
|---|---|---|---|---|---|---|---|---|---|---|---|---|
| | | 1 | 3 | 4 | 6 | 9 | 32 | 13 | 15 | 21 | 22 | 25 |
| Pressure | bar (a) | 21.7 | 22.6 | 21.4 | 21.6 | 21.6 | 5.6 | 21.5 | 5.5 | 2.8 | 3.0 | 2.8 |
| Temperature | deg C. | −180 | −181 | −181 | −173 | −180 | −168 | −178 | −167 | −182 | −146 | −182 |
| Flowrate | kgm/h | 100.0 | 39.1 | 69.4 | 48.2 | 17.5 | 7.4 | 3.9 | 2.8 | 30.3 | 43.0 | 6.5 |
| Hydrogen | mol % | 70.3 | | 98.7 | 2.2 | 3.6 | 8.6 | 1.8 | 62.4 | | | |
| Nitrogen | mol % | 1.4 | | 0.1 | 1.4 | 3.1 | 4.6 | 2.1 | 4.7 | 5.0 | | 5.0 |
| Carbon monoxide | mol % | 23.2 | | | 23.3 | 66.8 | 80.8 | 7.2 | 21.3 | 95.0 | | 95.0 |
| Methane | mol % | 5.0 | 100.0 | 1.1 | 73.0 | 26.4 | 6.0 | 88.9 | 11.5 | | 100.0 | |
| Vapor fraction | | 0.8232 | 0 | 1 | 0 | 0 | 1 | 0 | 1 | 1 | 0 | 0.0462 |

It will be appreciated that the invention is not restricted to the specific details described above with reference to FIGS. 2 and 3 but that numerous modifications can be made without departing from the spirit or scope of the invention as defined in the following claims. For example, one or more of the following modifications can be made to the process and apparatus of either FIG. 2 or FIG. 3:

- the second stripper 30 could be replaced by a flash separator;
- the methane wash could be omitted from the stripping column 8;
- the CO-loaded methane in conduit 6 could be preheated by indirect heat exchange after pressure reduction via valve 7;
- one or more of heat exchangers 11, 16, 20, 34, and 39 could be omitted;
- one of heat exchangers 26 and 28 could be omitted; and
- heat of solution could be removed by indirect heat exchange with at least part of a heat pump stream in a contactor heat exchanger located at the top of the stripping column 8 to achieve higher CO recovery or reduce the quantity of methane rich liquid used for washing.

What is claimed is:

1. A process for separating hydrogen and carbon monoxide from a condensate-containing gaseous mixture thereof, said process comprising:
   scrubbing the gaseous mixture, or a vapor portion from phase separation thereof, with a liquid methane wash stream in a methane wash column to provide a gaseous hydrogen product stream and a liquid CO-loaded methane stream;
   separating said CO-loaded methane stream into a gaseous hydrogen-rich stream and a "first" liquid CO/methane stream in a "first" stripping column; and
   separating said first liquid CO/methane stream into a gaseous carbon monoxide stream and a liquid methane stream in a separation column,
   wherein
      feed gas condensate from the methane wash column or the phase separation is separated into a "second" gaseous hydrogen-enriched stream and a "second" liquid CO/methane stream in a "second" stripping column or a flash separator;
      the second gaseous hydrogen-enriched stream is fed to the first stripping column; and
      the second liquid CO/methane stream is fed to the separation column.

2. The process according to claim 1, wherein said gaseous mixture consists primarily of hydrogen and carbon monoxide.

3. The process according to claim 2, wherein said gaseous mixture is synthesis gas produced by catalytic conversion or partial oxidation of natural gas, oils or other hydrocarbon feedstock.

4. The process according to claim 1, wherein the condensate-containing gas mixture is fed to the methane wash column and the CO-loaded methane and feed gas condensate are separately removed from vertically spaced locations of said column.

5. The process according to claim 1, wherein the condensate-containing gas mixture is phase separated to provide said feed gas condensate; the uncondensed (vapor) portion is fed to the methane wash column; and the condensate is fed to the second stripping column or flash separator.

6. The process according to claim 1, wherein the condensate is partially vaporized before being fed to the second stripping column or flash separator.

7. The process according to claim 1, wherein the second liquid CO/methane stream is split into at least two substreams; one substream is subcooled and the subcooled liquid introduced into the separation column and another substream is at least partially vaporized and introduced into the separation column at a location below that of the subcooled substream.

8. The process according to claim 1, wherein the first liquid CO/methane stream is split into at least two substreams; one substream is subcooled and the subcooled liquid introduced into the separation column and another substream is at least partially vaporized and introduced into the separation column at a location below that of said subcooled substream.

9. The process according to claim 1, wherein the first stripping column is refluxed with a methane-rich liquid stream withdrawn from an intermediate location of the methane wash column above the level of removal of the CO-loaded methane therefrom.

10. A process for separating hydrogen and carbon monoxide from a condensate-containing synthesis gas produced by catalytic conversion or partial oxidation of natural gas, oils or other hydrocarbon feedstock thereof, said process comprising:
   scrubbing the gaseous mixture with a liquid methane wash stream in a methane wash column to provide a gaseous hydrogen product stream, a "first" liquid CO-loaded methane stream and a feed gas condensate removed from a location vertically spaced from removal of said CO-loaded methane;
   separating said first liquid CO-loaded methane stream into a gaseous hydrogen-rich stream and a liquid CO/methane stream in a "first" stripping column;
   separating said CO/methane stream into a gaseous carbon monoxide stream and a liquid methane stream in a separation column;
   separating said feed gas condensate into a "second" gaseous hydrogen-enriched stream and a "second" liquid CO/methane stream in a "second" stripping column or a flash separator;
   feeding the second gaseous hydrogen-enriched stream to the first stripping column; and
   feeding the second liquid CO/methane stream to the separation column.

11. A process for separating hydrogen and carbon monoxide from a condensate-containing synthesis gas produced by catalytic conversion or partial oxidation of natural gas, oils or other hydrocarbon feedstock thereof, said process comprising:
   scrubbing the gaseous mixture with a liquid methane wash stream in a methane wash column to provide a gaseous hydrogen product stream, a liquid CO-loaded methane stream and a feed gas condensate removed from a location vertically spaced from removal of said CO-loaded methane;
   separating said CO-loaded methane stream into a gaseous hydrogen-rich stream and a "first" liquid CO/methane stream in a "first" stripping column;
   splitting said first liquid CO/methane stream into at least "first" and "second" substreams;
   subcooling said first substream and introducing the subcooled liquid into a separation column for separating the CO/methane stream into a gaseous carbon monoxide stream and a liquid methane stream;
   at least partially vaporizing said second substream and introducing it into the separation column at a location below that of said subcooled first substream;
   separating said feed gas condensate into a "second" gaseous hydrogen-enriched stream and a "second" liquid CO/methane stream in a "second" stripping column or a flash separator;
   feeding the second gaseous hydrogen-enriched stream to the first stripping column;
   splitting said second liquid CO/methane stream into at least "third" and "fourth" substreams;
   subcooling said third substream and introducing the subcooled liquid into the separation column; and
   at least partially vaporizing said fourth substream and introducing it into the separation column at a location below that of the said subcooled third substream.

12. A process for separating hydrogen and carbon monoxide from a condensate-containing synthesis gas produced by catalytic conversion or partial oxidation of natural gas, oils or other hydrocarbon feedstock thereof, said process comprising:
   phase separating said condensate-containing gas mixture to provide a feed gas condensate and feed vapor;
   scrubbing said feed vapor with a liquid methane wash stream in a methane wash column to provide a gaseous hydrogen product stream and a liquid CO-loaded methane stream;
   separating said CO-loaded methane stream into a gaseous hydrogen-rich stream and a "first" liquid CO/methane stream in a "first" stripping column;
   separating said first liquid CO/methane stream into a gaseous carbon monoxide stream and a liquid methane stream in a separation column;
   separating said feed gas condensate into a "second" gaseous hydrogen-enriched stream and a "second" liquid CO/methane stream in a "second" stripping column or a flash separator;
   feeding the second gaseous hydrogen-enriched stream to the first stripping column; and
   feeding the second liquid CO/methane stream to the separation column.

13. A process for separating hydrogen and carbon monoxide from a condensate-containing synthesis gas produced by catalytic conversion or partial oxidation of natural gas, oils or other hydrocarbon feedstock thereof, said process comprising:

phase separating said condensate-containing gas mixture to provide a feed gas condensate and feed vapor;

scrubbing said feed vapor with a liquid methane wash stream in a methane wash column to provide a gaseous hydrogen product stream and a liquid CO-loaded methane stream;

separating said CO-loaded methane stream into a gaseous hydrogen-rich stream and a "first" liquid CO/methane stream in a "first" stripping column;

splitting said first liquid CO/methane stream into at least "first" and "second" substreams;

subcooling said first substream and introducing the subcooled liquid into a separation column for separating the CO/methane stream into a gaseous carbon monoxide stream and a liquid methane stream;

at least partially vaporizing said second substream and introducing it into the separation column at a location below that of said subcooled first substream;

wherein separating said feed gas condensate into a "second" gaseous hydrogen-enriched stream and a "second" liquid CO/methane stream in a "second" stripping column or a flash separator;

feeding the second gaseous hydrogen-enriched stream to the first stripping column;

splitting said second liquid CO/methane stream into at least "third" and "fourth" substreams;

subcooling said third substream and introducing the subcooled liquid into the separation column; and at least partially vaporizing said fourth substream and introducing it into the separation column at a location below that of the said subcooled third substream.

14. An apparatus for separating hydrogen and carbon monoxide from a condensate-containing gaseous mixture thereof, said apparatus comprising:

a methane wash column;

phase separation means for removing feed gas condensate from the gaseous mixture to provide a feed vapor, means for feeding the feed vapor to the methane wash column;

a "first" stripping column;

a carbon monoxide/methane separation column;

means for feeding CO-loaded methane from the methane wash column to the first stripping column;

means for feeding liquid CO/methane from the first stripping column to the separation column; and means for recycling liquid methane from the separation column to the methane wash column, wherein the apparatus further comprises a second stripping column or a flash separator;

means for feeding feed gas condensate from the phase separation means to the second stripping column or flash separator;

means for feeding a "second" second gaseous hydrogen-enriched stream from the second stripping column or flash separator to the first stripping column; and means for feeding a "second" liquid CO/methane stream to the separation column.

15. The apparatus according to claim 14, wherein there is further provided heat exchange means for partially vaporizing the condensate before being fed to the second stripping column or flash separator.

16. The apparatus according to claim 14, wherein there is further provided means for subcooling a substream of the second liquid CO/methane stream and feeding the subcooled liquid to the separation column and means for at least partially vaporizing a second substream of the second liquid CO/methane stream and feeding the at least partially vaporized substream to the separation column at a location below that of the subcooled substream.

17. The apparatus according to claim 14, wherein there is further provided means for subcooling a substream of the first liquid CO/methane stream and feeding the subcooled liquid to the separation column and means for at least partially vaporizing a second substream of the first liquid CO/methane stream and feeding the at least partially vaporized substream to the separation column at a location below that of said subcooled substream.

18. An apparatus for separating hydrogen and carbon monoxide from a condensate-containing gaseous mixture thereof, said apparatus comprising:

a methane wash column having a sump;

means for feeding the gas mixture to the methane wash column;

a "first" stripping column;

a carbon monoxide/methane separation column;

means for feeding CO-loaded methane from a location of the methane wash column above the feed thereto to the first stripping column;

means for feeding liquid CO/methane from the first stripping column to the separation column; and means for recycling liquid methane from the separation column to the methane wash column, wherein the apparatus further comprises a second stripping column or a flash separator;

means for feeding feed gas condensate from the sump of the methane wash column to the second stripping column or flash separator;

means for feeding a "second" second gaseous hydrogen-enriched stream from the second stripping column or flash separator to the first stripping column; and means for feeding a "second" liquid CO/methane stream to the separation column.

19. The apparatus according to claim 18, wherein there is further provided heat exchange means for partially vaporizing the condensate before being fed to the second stripping column or flash separator.

20. The apparatus according to claim 18, wherein there is further provided means for subcooling a substream of the second liquid CO/methane stream and feeding the subcooled liquid to the separation column and means for at least partially vaporizing a second substream of the second liquid CO/methane stream and feeding the at least partially vaporized substream to the separation column at a location below that of the subcooled substream.

21. The apparatus according to claim 18, wherein there is further provided means for subcooling a substream of the first liquid CO/methane stream and feeding the subcooled liquid to the separation column and means for at least partially vaporizing a second substream of the first liquid CO/methane stream and feeding the at least partially vaporized substream to the separation column at a location below that of said subcooled substream.

* * * * *

UNITED STATES PATENT AND TRADEMARK OFFICE
CERTIFICATE OF CORRECTION

| | |
|---|---|
| PATENT NO. | : 6,269,657 B1 |
| DATED | : August 7, 2001 |
| INVENTOR(S) | : Brian Alfred McNeil |

It is certified that error appears in the above-identified patent and that said Letters Patent is hereby corrected as shown below:

<u>Title page,</u>
Item [30], cancel "Apr. 8, 1999" and insert -- August 4, 1999 --.

Signed and Sealed this

Twenty-first Day of May, 2002

Attest:

*Attesting Officer*

JAMES E. ROGAN
*Director of the United States Patent and Trademark Office*